United States Patent
Yang

(10) Patent No.: US 11,659,156 B2
(45) Date of Patent: May 23, 2023

(54) AUTOMATIC CALIBRATION METHOD FOR IMAGE ARRANGEMENT OF NAKED-EYE 3D DISPLAY SCREEN AND ELECTRONIC DEVICE

(71) Applicant: 3DVSTAR Display Technology Co., Ltd., Guangdong (CN)

(72) Inventor: Yajun Yang, Guangdong (CN)

(73) Assignee: 3DVSTAR Display Technology Co., Ltd., Shenzhen (CN)

( * ) Notice: Subject to any disclaimer, the term of this patent is extended or adjusted under 35 U.S.C. 154(b) by 73 days.

(21) Appl. No.: 17/430,321

(22) PCT Filed: Mar. 7, 2019

(86) PCT No.: PCT/CN2019/077368
§ 371 (c)(1),
(2) Date: Aug. 11, 2021

(87) PCT Pub. No.: WO2020/177132
PCT Pub. Date: Sep. 10, 2020

(65) Prior Publication Data
US 2022/0086421 A1    Mar. 17, 2022

(51) Int. Cl.
H04N 13/327    (2018.01)
H04N 13/322    (2018.01)

(52) U.S. Cl.
CPC ......... *H04N 13/327* (2018.05); *H04N 13/322* (2018.05)

(58) Field of Classification Search
CPC .... H04N 13/305; H04N 13/31; H04N 13/322; H04N 13/327
(Continued)

(56) References Cited

U.S. PATENT DOCUMENTS

2013/0163078 A1    6/2013    Saito
2013/0182083 A1*   7/2013    Grossmann .......... H04N 13/327
                                                    348/51
(Continued)

FOREIGN PATENT DOCUMENTS

CN    104661011 A    5/2015
CN    107155104 A    9/2017
(Continued)

OTHER PUBLICATIONS

Hyoseok Hwang et al., 3D Display Calibration by Visual Pattern Analysis, arxiv.org, Cornell University Library, 201 Olin Library Cornell University Ithaca, NY 14853, Jun. 23, 2016, pp. 1-10, XP080710326.
(Continued)

*Primary Examiner* — Christopher S Kelley
*Assistant Examiner* — Ana Picon-Feliciano

(57) ABSTRACT

The invention relates to an automatic calibration method for image arrangement of a naked-eye 3D display screen and electronic device. The method comprise: S1, displaying a first 3D test image on a display screen according to a preset viewing distance, and acquiring a mirror image of the first 3D test image in a flat mirror through a camera, wherein the first 3D test image comprises a first monochrome 3D left image and a black 3D right image; S2, adjusting a 3D display rotation angle and a left-right offset of a display screen according to a preset algorithm, acquiring a mirror image and acquiring the number of effective pixel points of the largest pixel block in each mirror image; S3, taking the 3D display rotation angle and the left-right offset corresponding to the mirror image to which the selected maximum effective pixel point number belongs as calibration parameters.

16 Claims, 4 Drawing Sheets

(58) Field of Classification Search
USPC .......................................................... 348/51
See application file for complete search history.

(56) References Cited

U.S. PATENT DOCUMENTS

| | | | |
|---|---|---|---|
| 2015/0023135 A1 | 1/2015 | Yuchi et al. | |
| 2016/0277728 A1* | 9/2016 | Guido | H04N 13/366 |
| 2016/0323570 A1 | 11/2016 | Kim et al. | |

FOREIGN PATENT DOCUMENTS

| | | |
|---|---|---|
| CN | 107249128 A | 10/2017 |
| CN | 107888906 A | 4/2018 |
| CN | 108036929 A | 5/2018 |
| CN | 108366248 A | 8/2018 |
| CN | 108469681 A | 8/2018 |
| CN | 108540794 A | 9/2018 |
| CN | 108696743 A | 10/2018 |
| CN | 109429056 A | 3/2019 |
| CN | 109963139 A | 7/2019 |
| EP | 3070943 A1 | 9/2016 |
| GN | 107346041 A | 11/2017 |

OTHER PUBLICATIONS

First Office Action of Counterpart Chinese Patent Application No. 201910173537.0 dated May 15, 2020.
Extended European Search Report of Counterpart European Patent Application No. 19917663.7 dated Mar. 14, 2022.
International Search Report and Written Opinion of PCT Patent Application No. PCT/CN2019/077368 dated Nov. 18, 2019.

* cited by examiner

AUTOMATIC CALIBRATION METHOD FOR IMAGE ARRANGEMENT OF NAKED-EYE 3D DISPLAY SCREEN AND ELECTRONIC DEVICE

BACKGROUND OF THE INVENTION

1. Technical Field

The invention relates to the field of naked-eye 3D display, in particular to an automatic calibration method for image arrangement of a naked-eye 3D display screen and an electronic device.

2. Description of Related Art

Naked-eye 3D display technology is becoming more and more popular because it does not require users to wear 3D glasses to achieve 3D viewing. The implementation principle of the naked-eye 3D display technology is as follows: a special 3D glass film is covered on a display screen of an electronic device, and the display content is rearranged according to the 3D display requirement, so that the left eye image and the right eye image can be respectively viewed by the left eye and the right eye of a user through the 3D glass film, and a 3D display effect is achieved.

After pasting the 3D glass film on the display screen of the electronic device, the image arrangement of the display screen needs to be calibrated so that the image arrangement of the display screen matches the pasting position of the 3D glass film to achieve the best viewing effect. The image arrangement calibration of the existing display screen is carried out manually, and a user needs to manually adjust the image arrangement parameters little by little according to the watched effect in the calibration process, so that the adjustment process is slow and complicated, good watching effect is difficult to achieve, and the user experience is not good.

BRIEF SUMMARY OF THE INVENTION

The technical problem to be solved by the invention is to provide an automatic calibration method for image arrangement of a naked-eye 3D display screen and an electronic device aiming at the defects of the prior art.

The technical scheme adopted by the invention to solve the technical problem is as follows: an automatic calibration method for image arrangement of a naked-eye 3D display screen is constructed, a 3D film is covered on the display screen, and the method comprises the following steps:

S1, displaying a first 3D test image on the display screen according to a preset viewing distance and acquiring a mirror image of the first 3D test image in a flat mirror through a camera, wherein the first 3D test image comprises a first monochrome 3D left image and a black 3D right image, and the flat mirror is arranged in parallel with the display screen;

S2, adjusting a 3D display rotation angle and a left-right offset of the display screen according to a preset algorithm, acquiring a mirror image after each adjustment through the camera, and acquiring the number of effective pixel points of the largest pixel block in each mirror image;

and S3, taking the 3D display rotation angle and the left-right offset corresponding to the mirror image to which the selected maximum effective pixel point number belongs as calibration parameters.

Further, in the automatic calibration method for image arrangement of a naked-eye 3D display screen of the present invention, the step S2 of adjusting a 3D display rotation angle and a left-right offset of the display screen according to a preset algorithm comprises:

keeping the 3D display rotation angle unchanged, and adjusting the left-right offset; and keeping the left-right offset unchanged, and adjusting the 3D display rotation angle.

Furthermore, in the automatic calibration method for image arrangement of the naked-eye 3D display screen of the present invention, keeping the 3D display rotation angle unchanged, and adjusting the left-right offset comprises:

keeping the 3D display rotation angle unchanged, and gradually increasing or gradually decreasing the left-right offset accord to a preset step length from an initial offset.

Furthermore, in the automatic calibration method for image arrangement of a naked-eye 3D display screen of the present invention, the step of gradually increasing or gradually decreasing the left-right offset according to a preset step length from an initial offset comprises:

after each adjustment of the left-right offset, if the number of effective pixel points of the largest pixel block in the mirror image is reduced after the adjustment, the left-right offset is gradually adjusted according to a preset step length in reverse from the initial offset.

Furthermore, according to the automatic calibration method for image arrangement of the naked-eye 3D display screen of the present invention, keeping the left-right offset unchanged, and adjusting the 3D display rotation angle comprises:

keeping the left-right offset unchanged, and gradually increasing or gradually decreasing the 3D display rotation angle according to a preset step length from an initial rotation angle.

Further, according to the automatic calibration method for image arrangement of the naked-eye 3D display screen of the present invention, the step of gradually increasing or gradually decreasing the 3D display rotation angle according to a preset step length from an initial rotation angle comprises:

after each adjustment of the 3D display rotation angle, if the number of effective pixel points of the largest pixel block in the mirror image is reduced after the adjustment, the 3D display rotation angle is gradually adjusted according to a preset step length in reverse from the initial rotation angle.

Further, according to the automatic calibration method for image arrangement of the naked-eye 3D display screen of the present invention, after the step S1 and before the step S2, the method further comprises:

S121: obtaining continuous pixel blocks of the same pigment in the mirror image;

S122: judging whether the number of oblique stripes formed by the continuous pixel blocks is greater than a preset number of stripes;

S123. taking the current 3D display rotation angle as an initial rotation angle when it is not.

Further, in the automatic calibration method for image arrangement of a naked-eye 3D display screen of the present invention, after the step S122, the method further comprises:

Step S1241: obtaining the horizontal width between the oblique stripes, when the number of oblique stripes formed by the continuous pixel blocks is greater than the preset number of stripe;

S1242: calculating the actual width of the oblique stripes on the display screen according to the horizontal width between the oblique stripes;

S1243: calculating an optimal row intercept according to the actual width of the oblique stripes on the display screen and a current row intercept;

Step S1244: calculating a current 3D display rotation angle according to the optimal row intercept and a physical raster width, and taking the current 3D display rotation angle as an initial rotation angle.

Further, in the automatic calibration method for image arrangement of a naked-eye 3D display screen of the present invention, before the step S1, the method further comprises:

S01, displaying a second 3D test image on the display screen, and acquiring a mirror image of the second 3D test image in a flat mirror through a camera, wherein the second 3D test image comprises a third monochromatic 3D left image and a third monochromatic 3D right image;

S02. determining a position and a size of the display screen in the second 3D test image according to the mirror image of the second 3D test image;

S03. calculating the distance L from the display screen to the mirror image according to the position and size of the display screen in the second 3D test image, the actual length PL of the display screen, and the field angle fov of the camera:

$$L=(PL*(W/pw)/2.0)/\tan(fov/2.0)$$

wherein W is the maximum pixel width of the camera, and pw is the length of the display screen in the mirror image.

In addition, the invention also provides electronic device which comprises a display screen, wherein the display screen is covered with a 3D film;

the electronic device further comprises a processor which is used for realizing the automatic calibration method for image arrangement of the naked-eye 3D display screen when the computer program stored in the memory is executed.

The invention relates to an automatic calibration method for image arrangement of a naked-eye 3D display screen and an electronic device, which has the following beneficial effects: the display screen of the electronic device is covered with a 3D film, and the method includes: S1, displaying a first 3D test image according to a preset viewing distance the display screen, and acquiring a mirror image of the first 3D test image in a flat mirror through a camera, wherein the first 3D test image comprises a first monochrome 3D left image and a black 3D right image, and the flat mirror is arranged in parallel with the display screen; S2, adjusting a 3D display rotation angle and a left-right offset of the display screen according to a preset algorithm, acquiring an adjusted mirror image after each adjustment through a camera, and acquiring the number of effective pixel points of a largest pixel block in each mirror image; and S3, taking the 3D display rotation angle and the left-right offset corresponding to the mirror image to which a selected maximum effective pixel point number belongs as calibration parameters. According to the invention, the display effect image in the mirror surface is acquired through the camera, and the calibration is automatically completed according to the mirror image; and the distance of the mirror surface is variable, so that a user does not need to manually adjust the distance little by little, and user experience is greatly improved.

BRIEF DESCRIPTION OF THE SEVERAL VIEWS OF THE DRAWINGS

Brief description of that drawing the invention will now be further described by way of example with reference to the accompany drawings in which.

DETAILED DESCRIPTION OF THE INVENTION

For a clearer understanding of the technical features, objects and effects of the present invention, a detailed description will now be given of specific embodiments of the present invention with reference to the accompanying drawings.

Embodiment

Figure 1:
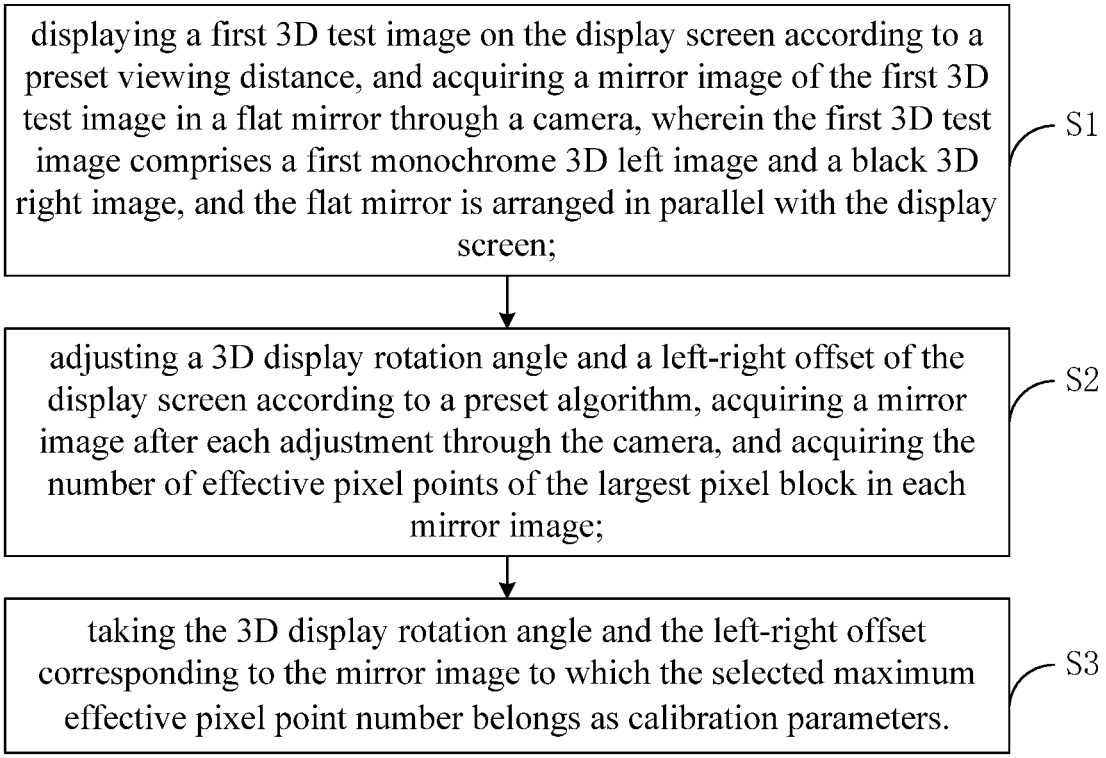
FIG. 1 is a flowchart of an automatic calibration method for image arrangement of a naked-eye 3D display screen according to an embodiment of the present invention.

Referring to FIG. 1, the automatic calibration method for image arrangement of a naked-eye 3D display screen of this embodiment is applied to an electronic device having a display screen, the electronic device has a camera on the side of the display screen, and the display screen is covered with a 3D film. Alternatively, the 3D film may be a lenticular lens type 3D film, a visual barrier type 3D film, or other 3D films with naked-eye display function. Before automatic calibration, the 3D film is firstly covered on the display screen, and then the flat mirror is placed on the side of the display screen, and the mirror surface (front surface) of the flat mirror is arranged opposite to the display screen to ensure that the flat mirror and the display screen are parallel. It should be noted that: the flat mirror and the display are not absolutely parallel, which is difficult for users to operate. In this embodiment, the parallel error between the flat mirror and the display screen is required to be within the preset error range. The flat mirror can be supported by a bracket, the type and the shape of the bracket are not limited, and the bracket can support the flat mirror and ensure that the flat mirror is parallel to the display screen. In addition, in this embodiment, the distance between the flat mirror and the display screen is half of the preset viewing distance, because according to the flat mirror imaging principle, the distance between the camera (the camera and the display screen are on the same plane) and the mirror image of the flat mirror is twice as long as the distance between the camera and the flat mirror. The automatic calibration can be start after that set is completed. The method comprises the following step:

S1, displaying a first 3D test image on that display screen according to a preset viewing distance, and acquiring a mirror image of the first 3D test image in a flat mirror through a camera, wherein the first 3D test image comprises a first monochrome 3D left image and a black 3D right image, and the first monochrome 3D left image and the black 3D right image can form a 3D image. The first monochrome 3D left image and the black 3D right image are solid color 3D images, for example, the first monochrome 3D left image is a green solid color image, i.e. RGB (0, 255, 0), and the black 3D right image is a black solid color image.

And S2, adjusting a 3D display rotation angle and a left-right offset of the display screen according to a preset algorithm, acquiring a mirror image after each adjustment through a camera, and acquiring the number of effective pixel points of the largest pixel block in each mirror image.

Specifically, after the mirror image after each adjustment is obtained, continuous pixel blocks with similar colors in the mirror image are searched, and the number of effective pixel points of the largest pixel block in each mirror image is obtained. Adjusting the 3D display rotation angle and the left-right offset of the display screen according to a preset algorithm in the step S2 comprises: keeping the 3D display rotation angle unchanged, and adjusting the left-right offset; and keeping the left-right offset unchanged, and adjusting the 3D display rotation angle. Hereinafter, description will be made separately.

Firstly, keeping the 3D display rotation angle unchanged, and adjusting the left-right offset comprises the following steps: keeping the 3D display rotation angle unchanged, gradually increasing or gradually decreasing the left-right offset accord to a preset step length from an initial offset. and the preset step length can be set according to the adjustment accuracy, for example, a percentage is used as a measurement in the adjustment process, and each time the preset step size is 0.1. Furthermore, the step of gradually increasing or gradually decreasing the left-right offset according to a preset step length from an initial offset comprises: after each adjustment of the left-right offset, if the number of effective pixel points of the largest pixel block in the mirror image is continuously increased, that is, the number of effective pixel point after adjustment is larger than the number of effective pixel points before adjustment, the adjustment direction is correct, The adjustment may continue until an effective pixel maximum occur. Of course, another situation may occur in the adjustment process, that is, after each adjustment of the left-right offset, if the number of effective pixel points of the largest pixel block in the mirror image decreases after the adjustment, indicating that the adjustment direction is incorrect, then the left-right offset is gradually adjusted according to the preset step length from the initial offset in the reverse direction, where the reverse direction means that if the original offset is increased, it is adjusted to decrease; if the original is reduced, it is adjusted to increase.

And secondly, keeping the left-right offset unchanged, and adjusting the 3D display rotation angle comprises the following step: keeping the left-right offset unchanged, gradually increase or gradually decreasing the 3D display rotation angle accord to a preset step length from an initial rotation angle, and the preset step length can be set accord to the adjustment precision, for example, 0.1 degree. Further, the step of gradually increasing or gradually decreasing the 3D display rotation angle according to a preset step length from an initial rotation angle comprises: after each adjustment of the 3D display rotation angle, if the number of effective pixel point of the largest pixel block in the mirror image is continuously increased, that is, the number of effective pixel point after adjustment is greater than that before adjustment, the adjustment direction is correct, the adjustment may continue until an effective pixel maximum occur. Of course, another situation may occur in the adjustment process, that is, after each adjustment of the 3D display rotation angle, if the number of effective pixel points of the largest pixel block in the mirror image decreases after adjustment, indicating that the adjustment direction is incorrect, then gradually adjust the 3D display rotation angle according to the preset step length from the initial rotation angle in the reverse direction, where the reverse direction means that if the original rotation angle is increased, it is adjusted to decrease; if the original is reduced, it is adjusted to increase.

Furthermore, the two parameters can be adjusted in an interval rotation mode, that is, the left-right offset is adjusted once every time the 3D display rotation angle is adjusted, and the number of effective pixel points of the largest pixel block in the mirror image in each adjustment is obtained. And then adjust the rotating angle of the 3D display, perform a round of adjustment on the left-right offset, and acquiring the effective pixel points of the largest pixel block in each mirror image in the round of adjustment. According to the rule, the number of effective pixels of the largest pixel block in the mirror image within the adjustable parameter range is found.

And S3, taking the 3D display rotation angle and the left-right offset corresponding to the mirror image to which the selected maximum effective pixel point number belongs as calibration parameters.

According to the embodiment, the display effect image in the mirror is acquired through the camera, and the calibration is automatically completed according to the mirror image, so that a user does not need to manually adjust a little bit, user experience is greatly improved, and the adjustment effect of the embodiment is better.

Embodiment

Figure 2:
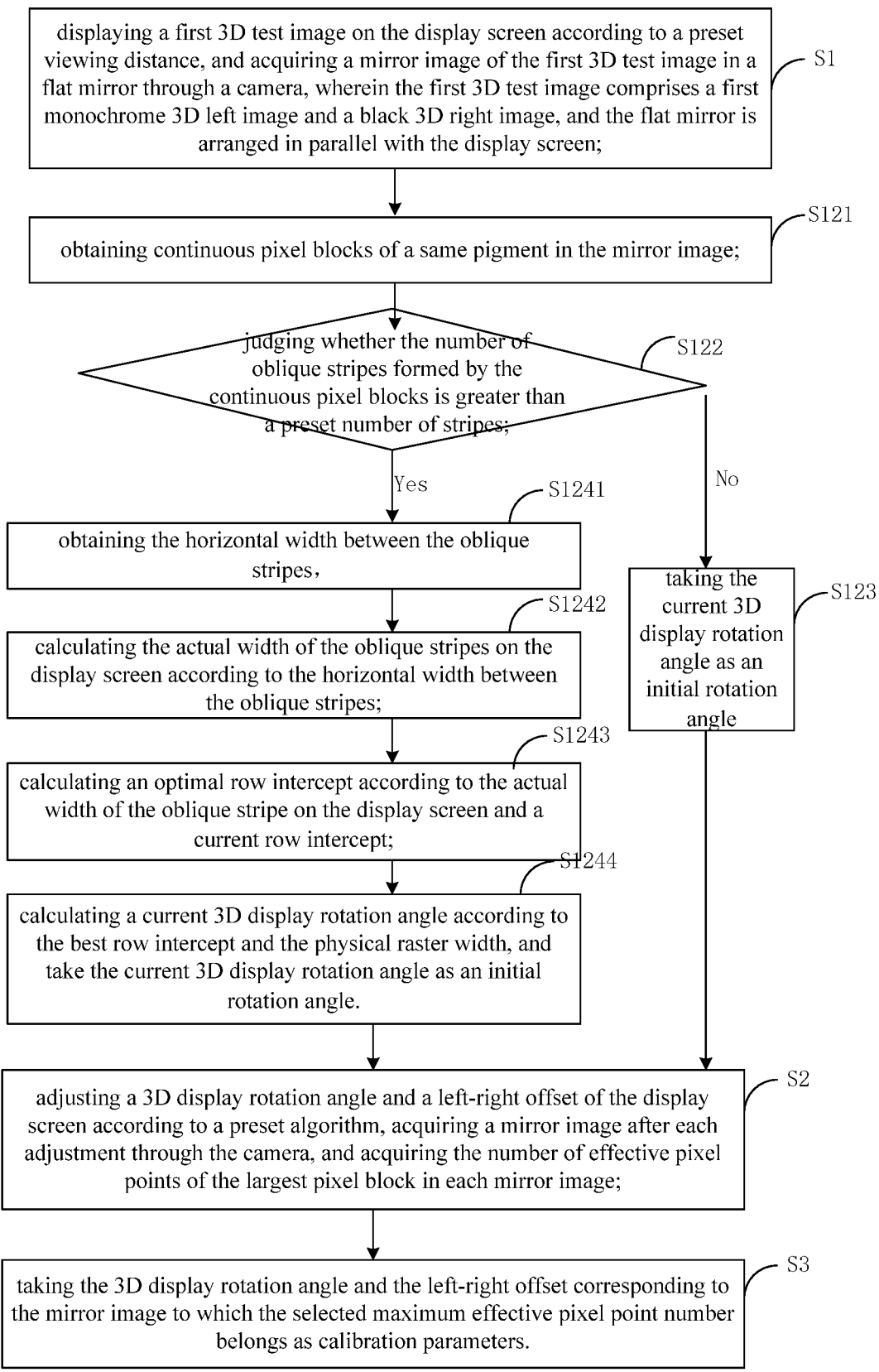
FIG. 2 is a flowchart of an automatic calibration method for image arrangement of a naked-eye 3D display screen according to an embodiment of the present invention.

Referring to FIG. 2, on the basis of the above embodiment, the automatic calibration method for image arrangement of a naked-eye 3D display screen of in this embodiment, after step S1 and before step S2, further comprises:

S121. obtaining continuous pixel blocks of a same pigment in the mirror image, and searching for continuous pixel blocks of similar color in the mirror image, where the continuous pixel blocks will form oblique stripes.

S122: Judging whether the number of the oblique stripes formed by the continuous pixel blocks is greater than a preset stripe number.

S123: If the number of diagonal stripes formed by the continuous pixel blocks is not greater than the preset number of the stripe, the current 3D display rotation angle is used as the initial rotation angle. It is explained that the 3D display rotation angle at this time is close to the optimum rotation angle, and step S2 can be directly performed.

Further, after step S122, the method further includes:

S1241: If the number of the oblique stripes formed by the continuous pixel blocks is greater than the preset number of the stripes, the horizontal width between the oblique stripes is obtained. When the horizontal width between the oblique stripes is obtained, the stripes in the middle of the continuous oblique stripes are selected, and the width between two adjacent oblique stripes is calculated; to improve accuracy, the widths between adjacent diagonal stripes are calculated and then averaged. For example, if there are 5 continuous oblique stripes, calculate the width between 2-3 stripes and 3-4 stripes, and then calculate the average value.

S1242: Calculating the actual width of the oblique stripes on the display screen according to the horizontal width between the oblique stripes.

S1243: Calculating the optimal row intercept according to the actual width of the oblique stripes on the display screen and a current row intercept.

S1244: Calculating a current 3D display rotation angle according to the best row intercept and a physical raster width, and take the current 3D display rotation angle as an initial rotation angle.

In the embodiment, considering the problem that the difference between the rotating angle after the user pasting the 3D film and the optimal 3D display rotating angle is large, whether the optimal layout intercept needs to be calculated or not is judged through the number of the stripes, so that the accuracy of automatic adjustment is further improved, and the adjustment efficiency can also be improved.

Embodiment

Figure 3:
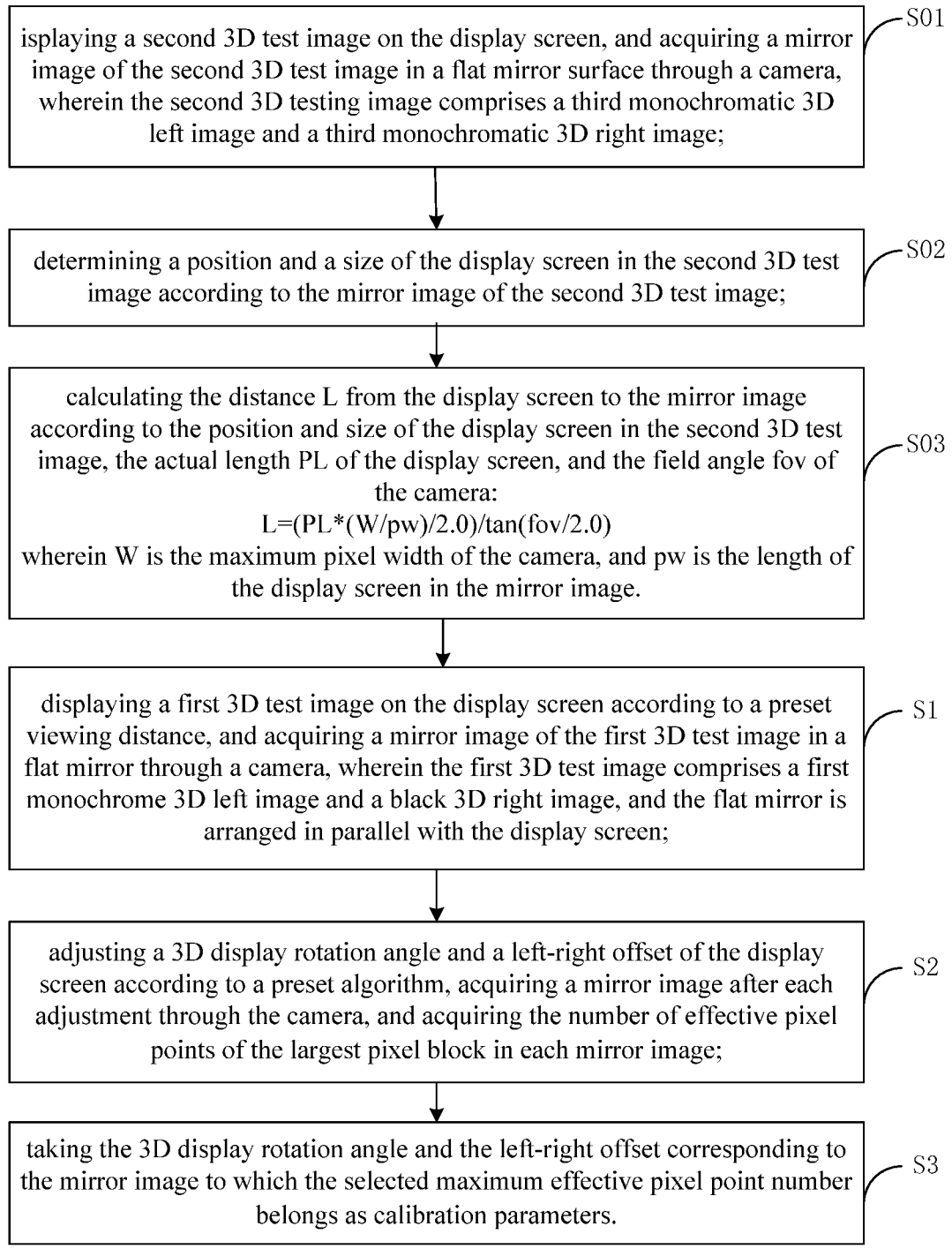
FIG. 3 is a flowchart of an automatic calibration method for image arrangement of a naked-eye 3D display screen according to an embodiment of the present invention.

Referring to FIG. 3, in the above embodiment, the distance between the flat mirror and the mobile phone screen is a preset distance.

On the basis of the above embodiment, the automatic calibration method for image arrangement of the naked-eye 3D display screen in this embodiment further comprises:

S01: displaying a second 3D test image on a display screen, and acquiring a mirror image of the second 3D test image in a flat mirror through a camera, wherein the second 3D test image comprises a third monochromatic 3D left image and a third monochromatic 3D right image, and the third monochromative 3D left image and the third monochrome 3D right image can constitute a 3D stereoscopic image. For example, the third monochromatic 3D left image and the third monochromatic 3D right image are respectively the green monochrome 3D left image and the green monochrome 3D right image, i.e. RGB (0, 255, 0).

S02. Determining the position and size of the display screen in the second 3D test image according to the mirror image of the second 3D test image. After the mirror image is obtained, the continuous pixel blocks with similar colors are searched, and if the third monochrome 3D left image and the third monochrome 3D right image are the green monochrome 3D left image and the green monochrome 3D right image, the continuous pixel blocks with similar green colors are searched. And finding a continuous pixel block in the continuous pixel blocks, the shape of which is closest to that of the display screen, wherein the aspect ratio of the shape of the display screen is known, and the pixel block is a mirror image of the second 3D test image in the flat mirror.

S03. Calculating the distance L from the display screen to the mirror image according to the position and size of the display screen in the second 3D test image, the actual length PL of the display screen, and the field angle fov of the camera:

$$L=(PL*(W/pw)/2.0)/\tan(fov/2.0)$$

Where W is the maximum pixel width of the camera, pw is the length of the display screen in the mirror image, and tan is a trigonometric function.

Compared with above embodiments, the embodiment does not require a user to place the flat mirror at a preset distance, but can place the flat mirror at any distance, and the camera can obtain the distance from the display screen to the mirror image through the test image, so that the calibration operation is more simplified, and the user only needs to ensure that the flat mirror is parallel to the display screen when placing the plane lens.

Embodiment

Figure 4:
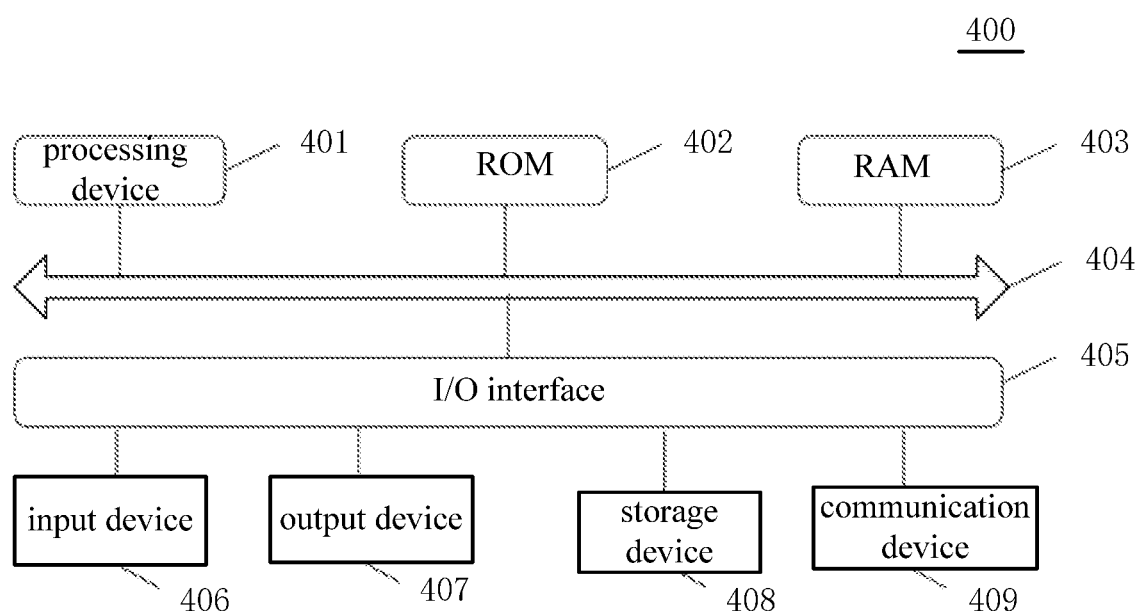
FIG. 4 is a schematic structural diagram of an electronic device according to an embodiment of the present invention.

Referring to FIG. 4, this embodiment further provides an electronic device, the electronic device comprises a display screen and a camera, and the display screen is covered with a 3D film; the electronic device further includes a processor for implementing the above-described automatic calibration method for image arrangement of a naked-eye 3D display screen when executing the computer program stored in the memory.

Referring now to FIG. 4, a block diagram of an electronic device 400 suitable for implementing embodiments of the present invention is shown. Electronic device in embodiments of that present invention may include, but are not limit to, electronic devices such as mobile phones, notebook computers, digital broadcast receiver, PDAs (personal digital assistants), PADs (tablet computers), PMPs (portable multimedia players), in-vehicle electronic devices (E. G in-vehicle navigation electronic devices), and stationary electronic devices such as digital TVs, desktop computers, and the like. The electronic device shown in FIG. 4 is merely an example and should not be construed as limiting the functionality and scope of use of the embodiments of the present invention.

As shown in FIG. 4, the electronic device 400 may include a processing device (e.g. a central processing unit, a graphics processor, etc.) 401 that may perform various appropriate actions and processes in accordance with programs stored in a read only memory (ROM) 402 or loaded into a random access memory (RAM) 403 from a storage device 408. In the RAM 403, various programs and data necessary for the operation of the electronic apparatus 400 are also stored. The processing device 401, the ROM 402, and the RAM 403 are connected to each other through a bus 404. Input/output (I/O) interface 405 is also connected to bus 404.

Generally, the following devices may be connected to the I/O interface 405: an input device 406 including, for example, a touch screen, touch pad, keyboard, mouse, camera, microphone, accelerometer, gyroscope, etc. An output device 407 including, for example, a liquid crystal display (LCD), a speaker, a vibrator, etc. A storage device 408 including, for example, a magnetic tape, a hard disk, etc. And a communication device 409. The communication device 409 may allow the electronic device 400 to wirelessly or wiredly communicate with other devices to exchange data. While FIG. 4 illustrates an electronic device 400 having various means, it should be understood that not all illustrated means are required to be implemented or provided. More or fewer devices may alternatively be implemented or provided.

In particular, the processes described above with reference to the flowcharts may be implemented as computer software programs in accordance with embodiments of the present invention. For example, embodiments of the invention include a computer program product comprising a computer program embodied on a computer-readable medium, the computer program embodying program code for performing the method illustrated by the flowchart. In such an embodiment, the computer program may be downloaded and installed from a network through the communication device 409, or installed from the storage device 408, or from the ROM 402. The computer program, when executed by the processing device 401, performs the functions described above as defined in the method of an embodiment of the invention.

It should be noted that the above computer readable medium of the present invention can be a computer readable signal medium or a computer storage medium or any combination of the two. The computer storage medium may be, for example, but not limited to, an electronic, magnetic, optical, electromagnetic, infrared, or semiconductor system, apparatus, or device, or any combination thereof. More specific examples of computer storage media may include, but are not limited to, an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical memory device, a magnetic memory device, or any suitable combination of the foregoing. For the purposes of the present invention, a computer storage medium may be any tangible medium that can contain, or store a program for use by or in connection with an instruction execution system, apparatus, or device. In that present invention, however, the computer-readable signal medium may comprise a propagate data signal in baseband or as part of a carrier wave, have computer-readable program code embodied therein. Such propagated data signals may take a variety of forms including, but not limited to, electromagnetic signals, optical signals, or any suitable combination of the foregoing. A computer-readable signal medium may also be any computer-readable medium that is not computer storage media and that can transmit, propagate, or transport a program for use by or in connection with an instruction execution system, apparatus, or device. Program code embodied on a computer readable medium may be transmitted using any suitable medium including, but not limited to, electrical wiring, fiber optic cable, RF (radio frequency), etc or any suitable combination of the foregoing.

The computer-readable medium may be included in the electronic device described above; and may also be present alone and not assemble into that electronic device.

The computer-readable medium carries one or more programs that, when executed by the electronic device, cause the electronic device to: obtain at least two Internet protocol addresses; sending a node evaluation request including at least two Internet protocol addresses to a node evaluation device, wherein the node evaluation device selects and returns the Internet protocol address from the at least two Internet protocol addresses; receiving the Internet protocol address returned by the node evaluation device; wherein, the obtained Internet protocol address indicates an edge node in the content distribution network.

Alternatively, the computer-readable medium carries one or more programs that, when executed by the electronic device, cause the electronic device to: receive a node evaluation request including at least two Internet Protocol addresses; selecting an Internet protocol address from at least two Internet protocol addresses; returning the selected Internet protocol address; wherein the received Internet protocol address indicates an edge node in the content distribution network.

Computer program code for carrying out operations of the present invention may be written in one or more programming languages, including object oriented programming languages such as Java, Smalltalk, C++, conventional procedural programming languages such as the "C" language or similar programming languages, or a combination thereof. The program code may execute entirely on the user's computer, partly on the user's computer, as a stand-alone software package, partly on the user computer and partly on a remote computer, or entirely on the remote computer or server. In the case of a remote computer, the remote computer may be connected through any kind of network, including a local area network (LAN) or a wide area network (WAN), Connecting to the user's computer, or alternatively, connecting to an external computer (for example through the Internet using an Internet service provider)

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which contains one or more executable instructions for implementing the specified logical function. It should also be noted that in some alternative implementations, the functions noted in the blocks may occur in a different order than noted in the figures. For example, two blocks shown in succession may in fact be executed substantially concurrently, or they may sometimes be executed in the reverse order, depending on the functionality involved. It is also noted that each block of the block diagrams and/or flowchart illustration, and combinations of blocks in the block diagrams and/or flowchart illustration, can be implemented by special purpose hardware-based systems which perform the specified functions or acts, or combinations of special purpose hardware and computer instructions.

The elements described in the embodiments of the present invention may be implemented in software or may be implemented in hardware. Wherein the name of the unit in some cases does not constitute a limitation of the unit itself, for example, the first obtaining unit may also be described as "a unit for obtaining at least two Internet protocol addresses".

The embodiments are described in this specification in a progressive manner, with emphasis being placed on the differences between each embodiment and the other embodiments, and with reference to like parts of the embodiments. As for the device disclosed in the embodiment, since it corresponds to the method disclosed in the embodiment, the description is relatively simple, and the description of the related part can be referred to the method part.

Those skilled in the art will further appreciate that the example elements and algorithm steps described in connection with the embodiments disclosed herein can be implemented as electronic hardware, computer software, or a combination of both, and that the example components and steps have been described generally functionally throughout the foregoing description in order to clearly illustrate the interchangeability of hardware and software. Whether these functions are performed in hardware or software depends on the particular application and design constraints of the technical solution. Killed artisans may implement the described functionality using different approaches for each particular application, but such implementations should not be construed as beyond the scope of the present invention.

The above embodiments are only for illustrating the technical concepts and features of the present invention, and are intended to enable those skilled in the art to understand and implement the present invention, but not to limit the scope of protection of the present invention. All equivalent change and modifications that come within that scope of the append claims are intended to be embraced therein.

What is claimed is:

1. An automatic calibration method for image arrangement of a naked-eye 3D display screen, wherein the display screen is covered with a 3D film, the method comprising:
   S1, displaying a first 3D test image on the display screen according to a preset viewing distance, and acquiring a mirror image of the first 3D test image in a flat mirror through a camera, wherein the first 3D test image comprises a first monochrome 3D left image and a black 3D right image, and the flat mirror is arranged in parallel with the display screen;
   S2, adjusting a 3D display rotation angle and a left-right offset of the display screen according to a preset algorithm, acquiring a mirror image after each adjustment through the camera, and acquiring the number of effective pixel points of the largest pixel block in each mirror image;

and S3, taking the 3D display rotation angle and the left-right offset corresponding to the mirror image to which the selected maximum effective pixel point number belongs as calibration parameters; wherein after the step S1 and before the step S2, the method further comprises:

S121: obtaining continuous pixel blocks of a same pigment in the mirror image;

S122: judging whether the number of oblique stripes formed by the continuous pixel blocks is greater than a preset number of stripes;

S123. taking the current 3D display rotation angle as an initial rotation angle when it is not.

2. The automatic calibration method for image arrangement of a naked-eye 3D display screen according to claim 1, wherein adjusting a 3D display rotation angle and a left-right offset of the display screen according to a preset algorithm in step S2 comprises:
keeping the 3D display rotation angle unchanged, and adjusting the left-right offset; and
keeping the left-right offset unchanged, and adjusting the 3D display rotation angle.

3. The automatic calibration method for image arrangement of naked-eye 3D display screen according to claim 2, wherein keeping the 3D display rotation angle unchanged, and adjusting the left-right offset comprises:
keeping the 3D display rotation angle unchanged, and gradually increasing or gradually decreasing the left-right offset accord to a preset step length from an initial offset.

4. The automatic calibration method for image arrangement of a naked-eye 3D display screen according to claim 3, wherein the step of gradually increasing or gradually decreasing the left-right offset according to a preset step length from an initial offset comprises:
after each adjustment of the left-right offset, if the number of effective pixel points of the largest pixel block in the mirror image is reduced after the adjustment, the left-right offset is gradually adjusted according to a preset step length in reverse from the initial offset.

5. The automatic calibration method for image arrangement of a naked-eye 3D display screen according to claim 2, wherein keeping the left-right offset unchanged, and adjusting the 3D display rotation angle comprises:
keeping the left-right offset unchanged, gradually increasing or gradually decreasing the 3D display rotation angle according to a preset step length from an initial rotation angle.

6. The automatic calibration method for image arrangement of the naked-eye 3D display screen according to claim 5, wherein the gradually increasing or gradually decreasing the 3D display rotation angle according to a preset step length from an initial rotation angle comprises:
after each adjustment of the 3D display rotation angle, if the number of effective pixel points of the largest pixel block in the mirror image is reduced after the adjustment, the 3D display rotation angle is gradually adjusted according to a preset step length in reverse from the initial rotation angle.

7. The automatic calibration method for image arrangement of the naked-eye 3D display screen according to claim 1, wherein after the step S122, the method further comprises:

S1241: obtaining the horizontal width between the oblique stripes, when the number of oblique stripes formed by the continuous pixel blocks is greater than the preset number of stripe;

S1242: calculating the actual width of the oblique stripes on the display screen according to the horizontal width between the oblique stripes;

S1243: calculating an optimal row intercept according to the actual width of the oblique stripe on the display screen and a current row intercept;

S1244: calculating a current 3D display rotation angle according to the best row intercept and the physical raster width, and take the current 3D display rotation angle as an initial rotation angle.

8. The automatic calibration method for image arrangement of the naked-eye 3D display screen according to claim 1, wherein before the step S1, the method further comprises:

S01, displaying a second 3D test image on the display screen, and acquiring a mirror image of the second 3D test image in a flat mirror surface through a camera, wherein the second 3D testing image comprises a third monochromatic 3D left image and a third monochromatic 3D right image;

S02. determining a position and a size of the display screen in the second 3D test image according to the mirror image of the second 3D test image;

S03. calculating the distance L from the display screen to the mirror image according to the position and size of the display screen in the second 3D test image, the actual length PL of the display screen, and the field angle fov of the camera:

$$L=(PL*(W/pw)/2.0)/\tan(fov/2.0)$$

wherein W is the maximum pixel width of the camera, and pw is the length of the display screen in the mirror image.

9. An electronic device comprising a display screen, wherein the display screen is covered with a 3D film;
the electronic device further comprises a processor for implementing the automatic calibration method for image arrangement of the naked-eye 3D display screen according to claim 1 when the computer program stored in the memory is executed; wherein after the step S1 and before the step S2, the processor is used to further perform the following steps:

S121: obtaining continuous pixel blocks of a same pigment in the mirror image;

S122: judging whether the number of oblique stripes formed by the continuous pixel blocks is greater than a preset number of stripes;

S123. taking the current 3D display rotation angle as an initial rotation angle when it is not.

10. The electronic device according to claim 9, wherein adjusting a 3D display rotation angle and a left-right offset of the display screen according to a preset algorithm in step S2 comprises:
keeping the 3D display rotation angle unchanged, and adjusting the left-right offset; and
keeping the left-right offset unchanged, and adjusting the 3D display rotation angle.

11. The electronic device according to claim 10, wherein keeping the 3D display rotation angle unchanged, and adjusting the left-right offset comprises:
keeping the 3D display rotation angle unchanged, and gradually increasing or gradually decreasing the left-right offset accord to a preset step length from an initial offset.

12. The electronic device according to claim 11, wherein the step of gradually increasing or gradually decreasing the left-right offset according to a preset step length from an initial offset comprises:

after each adjustment of the left-right offset, if the number of effective pixel points of the largest pixel block in the mirror image is reduced after the adjustment, the left-right offset is gradually adjusted according to a preset step length in reverse from the initial offset.

13. The electronic device according to claim 10, wherein keeping the left-right offset unchanged, and adjusting the 3D display rotation angle comprises:

keeping the left-right offset unchanged, gradually increasing or gradually decreasing the 3D display rotation angle according to a preset step length from an initial rotation angle.

14. The electronic device according to claim 13, wherein the gradually increasing or gradually decreasing the 3D display rotation angle according to a preset step length from an initial rotation angle comprises:

after each adjustment of the 3D display rotation angle, if the number of effective pixel points of the largest pixel block in the mirror image is reduced after the adjustment, the 3D display rotation angle is gradually adjusted according to a preset step length in reverse from the initial rotation angle.

15. The electronic device according to claim 9, wherein after the step S122, the processor is used to further perform the following steps:

S1241: obtaining the horizontal width between the oblique stripes, when the number of oblique stripes formed by the continuous pixel blocks is greater than the preset number of stripe;

S1242: calculating the actual width of the oblique stripes on the display screen according to the horizontal width between the oblique stripes;

S1243: calculating an optimal row intercept according to the actual width of the oblique stripe on the display screen and a current row intercept;

S1244: calculating a current 3D display rotation angle according to the best row intercept and the physical raster width, and take the current 3D display rotation angle as an initial rotation angle.

16. The electronic device according to claim 9, wherein before the step S1, the processor is used to further perform the following steps:

S01, displaying a second 3D test image on the display screen, and acquiring a mirror image of the second 3D test image in a flat mirror surface through a camera, wherein the second 3D testing image comprises a third monochromatic 3D left image and a third monochromatic 3D right image;

S02. determining a position and a size of the display screen in the second 3D test image according to the mirror image of the second 3D test image;

S03. calculating the distance L from the display screen to the mirror image according to the position and size of the display screen in the second 3D test image, the actual length PL of the display screen, and the field angle fov of the camera:

$$L=(PL*(W/pw)/2.0)/\tan(fov/2.0)$$

wherein W is the maximum pixel width of the camera, and pw is the length of the display screen in the mirror image.

* * * * *